May 8, 1945.  J. R. SCHONBERG ET AL  2,375,590
SETTLER
Filed Dec. 15, 1942  2 Sheets-Sheet 1
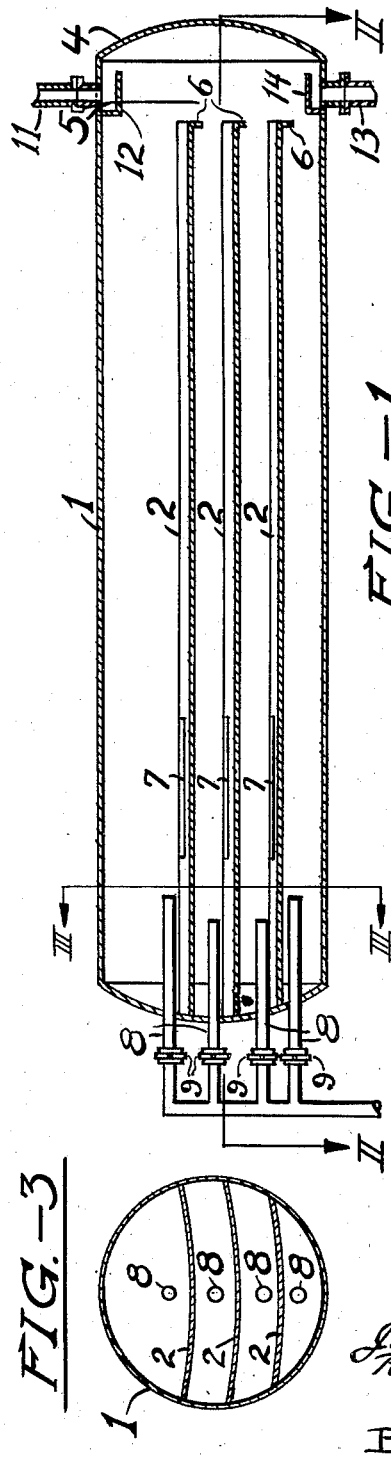
FIG.-1
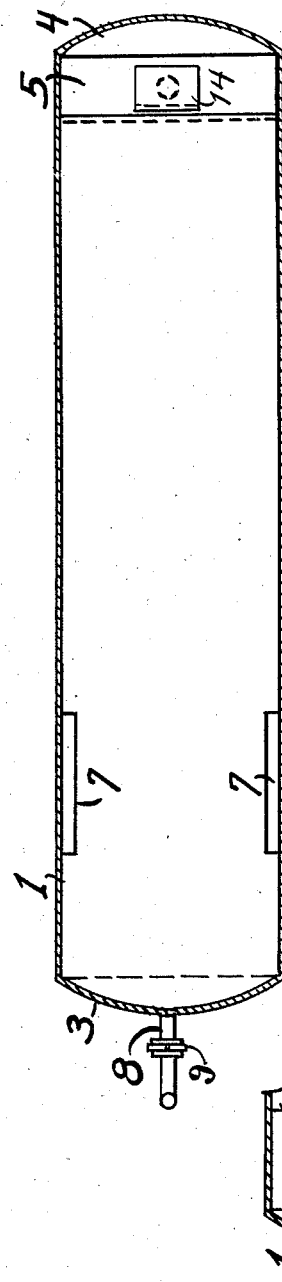
FIG.-2
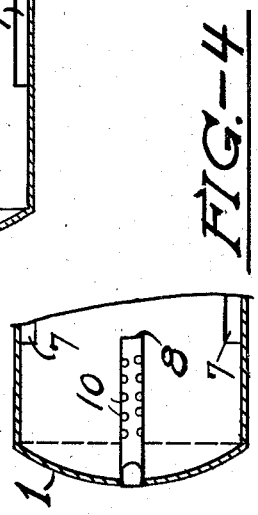
FIG.-4
FIG.-3
Jackson R. Schonberg,
Richard A. Given Inventors
By P. L. Young Attorney May 8, 1945.　　J. R. SCHONBERG ET AL　　2,375,590
SETTLER
Filed Dec. 15, 1942　　2 Sheets-Sheet 2

Jackson R. Schonberg
Richard A. Given  Inventors
By  Attorney

Patented May 8, 1945

2,375,590

UNITED STATES PATENT OFFICE 2,375,590

SETTLER

Jackson R. Schonberg, Westfield, and Richard A. Given, Elizabeth, N. J., assignors to Standard Oil Development Company, a corporation of Delaware Application December 15, 1942, Serial No. 469,132

5 Claims. (Cl. 210—51)

This invention relates to an improved settler and particularly to a settler in which a more rapid separation of two immiscible liquids is obtained.

Most of the commercial settlers now used are ordinary shells in which the separation of two immiscible liquids is obtained by gravity. The object of this invention is to provide an improved settler of this type in which a more rapid continuous gravity separation of the two immiscible liquids may be obtained.

This and other objects of the invention will be understood on reading the following detailed description taken in conjunction with the accompanying drawings in which Fig. 1 is a detailed sectional side view showing the interior construction and arrangement of the settler;

Fig. 2 is a detailed plan view of the settler looking downward along the line of II—II;

Fig. 3 is a detailed end view looking along the line of III—III,

Fig. 4 is an outside view of one of the distributing pipes used for introducing the mixture into the settler.

Figure 5:
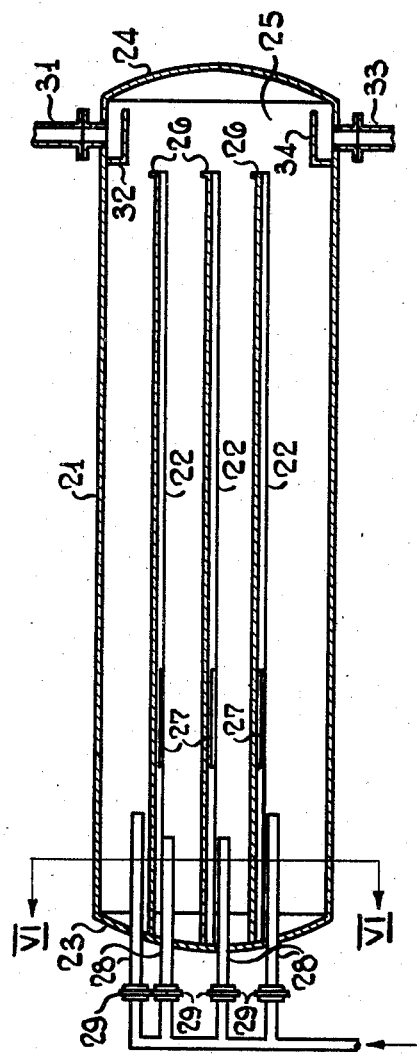
Fig. 5 is a detailed sectional view showing the interior construction and arrangement of another settler.

Numeral 1 denotes an outside shell. In the shell are provided a number of horizontal baffles 2, which are sealed to one end 3 of the shell. The baffles 2 do not extend to the other end 4 of the shell but leave an open channel 5 from the top to the bottom. The unsealed ends of the baffles are provided with baffles 6 which extend downwardly forming a dam and preventing the flow of light material into the open channel 5. The baffles 2 are sealed against the sides of the shell except near the inlet end in spaced relation to the end; slots 7 are provided in each baffle at the side wall to permit flow of liquid upward. Also these horizontal baffles have an upward slope of about 1 inch per 20 to 40 inches from the center upward to the sides of the vessel, as shown in Fig. 3, to encourage flow of liquid passing upward to the sides of the vessel. Into each settling zone formed by the baffles and walls of the shell is introduced one of pipes 8. These pipes are provided with orifice plates 9 having holes of proper size to distribute the incoming fluid to the settling zones in proportion to their settling volumes. The portion of the pipes 8 which is inside the shell has openings 10 on both sides of the pipes, either round holes as shown or vertical slots, to distribute the liquid across the entire cross-section of each settling zone without causing excessive turbulence. The liquid mixture as it flows from the inlet end to the outlet end of the settling zone separates into the lighter and the heavier liquids. The lighter liquid flows upward to the horizontal baffles and, after a layer collects, flows along the baffle to the side of the shell, back along the baffle to the slots 7, and upward through the slots 7 into the top zone. By controlling the flow of liquids from the settler a liquid interface is maintained in this top zone at a sufficient distance below the top of the settler to provide time for any heavier liquid carried to this zone by the lighter liquid to settle downward. Also this time gives any emulsion brought into the settler a chance to break down into the component heavier and lighter liquids. The lighter liquid, after flowing across the top part of the settler leaves through the nozzle and pipe 11. The vortex breaker 12 prevents creation of a vortex which might extend below the interface and draw heavier material up with the lighter liquid. The heavier liquid from which the lighter liquid has settled flows out the end of each settling zone into the channel 5 and leaves the settler through the nozzle and pipe 13, the vortex breaker 14 preventing creation of a vortex which might draw lighter liquid down with the heavier liquid.

This settler provides maximum utilization of the settling volume, the horizontal baffles reducing the settling distance and therefore the settling time for separation of the lighter liquid from the heavier, the distributing system providing gentle flow of the proper quantity of liquid mixture to each of the settling zones, the slots in the horizontal baffles providing an exit for the lighter material settled out in each zone, the lighter liquid layer of the top providing time for settling of the heavier liquid from the lighter liquid and time for breaking of emulsion, and the vortex breakers preventing remixing of the two settled layers.

This settler as described is particularly adapted to settling in which the larger part of the settler is required for settling of lighter material from heavier material. For cases in which the larger part of the settler is required for settling heavier material from lighter material the settler as described by Figs. 5 and 6 would be used. It is especially adapted to separate an aqueous cuprous salt solution, used in separating olefins or diolefins, from a hydrocarbon mixture maintained in the liquid phase.

Figure 6:
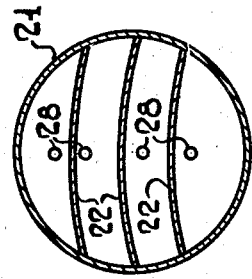
Fig. 6 is the detailed plan view looking along the line VI—VI.

Numeral 21 denotes an outside shell. In the shell are provided a number of horizontal baffles 22 which are sealed to one end 23 of the shell. The baffles 22 do not extend to the other end of the shell but leave an open channel 25 from the top to the bottom. The unsealed ends of the baffles are provided with baffles 26 which extend upwardly forming a dam and preventing the flow of the heavy material into the open channel 25. The baffles 22 are sealed against the sides of the shell except near the inlet and in spaced relation to the end; slots 27 are provided in each baffle at the side wall to permit flow of material downward. Also these horizontal baffles have a downward slope of about 1 inch per 20 to 40 inches from the center downward to the sides of the vessel, as shown in Fig. 6, to encourage flow of the liquid passing downward to the sides of the vessel. Into each settling zone formed by the baffles and walls of the shell is introduced one of the pipes 28. These pipes are provided with orifice plates 29 having holes of the proper size to distribute the incoming fluid to the settling zones in proportion to their settling volumes. The portion of the pipes 28 which is inside the shell has openings on both sides of the pipe either round holes as shown in Fig. 4 or vertical slots, to distribute the liquid across the entire cross section of each settling zone without causing excessive turbulence. The liquid mixture as it flows to the inlet and to the outlet end of the settling zone separates into the lighter and the heavier liquids. The heavier liquid flows downward to the horizontal baffles and, after a layer collects, flows along the baffles to the sides of the shell back along the baffle to the slots 27 and downward through the slots 27 into the lower zone. By controlling the flow of liquids from the settler a liquid interface is maintained in the bottom zone to provide time for any lighter liquid carried to this zone by the heavier liquid to flow upward. Also this time gives any emulsion brought into the settler a chance to break down into the component heavier and lighter liquids. The lighter liquid after flowing across the top part of the settler leaves through the nozzle and pipe 31. Vortex breaker 32 prevents creation of a vortex which might extend below the interface and draw heavier liquid up with the lighter liquid. The heavier liquid from which the lighter liquid has separated, flows out through pipe 33, the vortex breaker 34 preventing creation of a vortex which might draw lighter liquid down with the heavier liquid.

We claim:

1. A horizontal settler for separating two essentially immiscible liquids, which has (1) a substantially closed shell horizontally disposed, (2) evenly spaced horizontal baffles sealed to said shell on the inlet end and on the sides except for a slot on each side of each baffle near the inlet end, said baffles forming with the walls of said shell a number of settling zones including a top settling zone, (3) an open channel from top to bottom at the outlet end of said shell, (4) dams on the bottom of each horizontal baffle on the end next to the open channel, (5) inlet pipes to said settling zones, said pipes having orifices of the proper size to distribute the liquid into said settling zones in proportion to their settling volumes and a plurality of openings on the sides of the portion of said pipes inside said shell to distribute the liquid across the entire cross section of each settling zone without causing excessive turbulence, (6) adjustable means at the top and at the bottom of the outlet end of said shell for regulating the volume withdrawal of the lighter and heavier liquids, respectively, said means controlling the flow of liquids from the settler so that a liquid interface is maintained at a definite level in said top settling zone, and (7) baffles within said shell at the outlet end to prevent formation of vortices by the lighter and heavier liquids leaving the settler at the top and bottom, respectively.

2. A horizontal settler for separating two essentially immiscible liquids, which settler has (1) a substantially closed shell horizontally disposed, (2) evenly spaced horizontal baffles sealed to said shell on the inlet end and on the sides except for a slot on each side of each baffle near the inlet end, said baffles forming with the walls of said shell a number of settling zones including a bottom settling zone, (3) an open channel from top to bottom at the outlet end of said shell, (4) dams on the top of each horizontal baffle on the end next to the open channel, (5) inlet pipes to said settling zones, said pipes having orifices of the proper size to distribute the liquid into said settling zones in proportion to their settling volumes and a plurality of openings on the sides of the portion of said pipes inside said shell to distribute the liquid across the entire cross section of each settling zone without causing excessive turbulence, (6) adjustable means at the top and at the bottom of the outlet end of said shell for regulating the volume withdrawal of the lighter and heavier liquids, respectively, said means controlling the flow of liquids from the settler so that a liquid interface is maintained at a definite level in said bottom zone, (7) baffles within said shell at the outlet end to prevent formation of vortices by the lighter and heavier liquids leaving the settler at the top and bottom, respectively.

3. A settler as claimed in claim 1 wherein said first-named baffles have an upward slope of about 1 inch per 20–40 inches, from the center to the sides of said shell.

4. A settler as claimed in claim 2 wherein said first-named baffles have a downward slope of about 1 inch per 20–40 inches, from the center to the sides of said shell.

5. A horizontal settler for separating two essentially immiscible liquids, which has (1) a substantially closed shell horizontally disposed, (2) evenly spaced horizontal baffles sealed to said shell on the inlet end and on the sides except for a slot on each side of each baffle near the inlet end, said baffles forming with the walls of said shell a number of settling zones including a top settling zone, (3) an open channel from top to bottom at the outlet end of said shell, (4) dams on the end next to the open channel formed by upright baffles on the horizontal baffles that extend at right angles to the said horizontal baffles, (5) inlet pipes to said settling zones, said pipes having orifices of the proper size to distribute the liquid into said settling zones in proportion to their settling volumes and a plurality of openings on the sides of the portion of said pipes inside said shell to distribute the liquid across the entire closs section of each settling zone without causing excessive turbulence, (6) adjustable means at the top and at the bottom of the outlet end of said shell for regulating the volume withdrawal of the lighter and heavier liquids, respectively, said means controlling the flow of liquids from the settler so that a liquid interface is maintained at a definite level in said top settling zone, and (7) baffles within said shell at the outlet end to prevent formation of vortices by the lighter and heavier liquids leaving the settler at the top and bottom, respectively.

JACKSON R. SCHONBERG.
RICHARD A. GIVEN.